US005484263A

United States Patent [19]

Nagaraj et al.

[11] Patent Number: 5,484,263

[45] Date of Patent: Jan. 16, 1996

[54] NON-DEGRADING REFLECTIVE COATING SYSTEM FOR HIGH TEMPERATURE HEAT SHIELDS AND A METHOD THEREFOR

[75] Inventors: Bangalore A. Nagaraj, West Chester; Antoinette E. Weil, Cincinnati; John W. Devitt, Loveland, all of Ohio

[73] Assignee: General Electric Company, Cincinnati, Ohio

[21] Appl. No.: 324,303

[22] Filed: Oct. 17, 1994

[51] Int. Cl.$^{6}$ .............................. B32B 15/04; F01D 9/02

[52] U.S. Cl. .......................... 415/200; 428/472; 428/698

[58] Field of Search ............................ 415/200; 428/472, 428/698

[56] References Cited

U.S. PATENT DOCUMENTS

| | | | |
|---|---|---|---|
| 3,608,769 | 9/1971 | Gablin | 220/10 |
| 3,736,109 | 5/1973 | Darling et al. | 29/195 |
| 3,890,456 | 6/1975 | Dils | 428/216 |
| 4,055,705 | 10/1977 | Stecura et al. | 429/633 |
| 4,123,595 | 10/1978 | Chang | 428/667 |
| 4,399,199 | 8/1983 | McGill et al. | 428/633 |
| 4,448,855 | 5/1984 | Senaha et al. | 428/632 |
| 4,450,201 | 5/1984 | Brill et al. | 428/336 |
| 5,169,674 | 12/1992 | Miller | 427/456 |
| 5,223,045 | 6/1993 | Priceman | 148/268 |

*Primary Examiner*—Edward K. Look
*Assistant Examiner*—Michael S. Lee
*Attorney, Agent, or Firm*—Andrew C. Hess; David L. Narciso

[57] ABSTRACT

A heat shield which is adapted to be formed on an article which must operate in an environment in which the article is subject to thermal radiation while at an elevated service temperature. The heat shield is composed of a barrier layer formed or deposited on the surface of the article, and a reflective layer on the barrier layer. The reflective layer serves to reflect a majority of the thermal radiation which is incident on the article. The barrier layer serves to substantially prevent degradation of the reflective layer at the elevated service temperature, so as to prevent the reflectivity of the reflective layer from being degraded while the article is in service. The reflective layer is preferably a noble metal, a noble metal alloy or aluminum, while the barrier layer is preferably a nitride, aluminum oxide, yttria-stabilized zirconia, or an oxide which can be grown by oxidation of the article's surface.

10 Claims, 1 Drawing Sheet

NON-DEGRADING REFLECTIVE COATING SYSTEM FOR HIGH TEMPERATURE HEAT SHIELDS AND A METHOD THEREFOR

This invention relates to heat shields for articles exposed to high temperatures, such as the hostile thermal environment of a gas turbine engine. More particularly, this invention is directed to a heat shield coating for an article, in which a barrier layer is formed between the heat shield and the surface of the article, such that the heat shield coating will not degrade when exposed to elevated temperatures.

BACKGROUND OF THE INVENTION

Temperatures in the nozzle section of a gas turbine engine generally exceed 500° C. In order to minimize the operating temperature of the structural components in the nozzle section, cooling air is typically forced over the components. An example is the hot section nozzle inserts which are circumscribed by the nozzle wall of a gas turbine. Under some circumstances, the flow rate of air over the nozzle inserts can be reduced, resulting in a higher operating temperature for the nozzle inserts and a higher temperature for the cooling air downstream of the nozzle inserts. The operating temperature of the nozzle inserts is determined in part by radiative heat transfer through the static air gap between the inner surfaces of the nozzle walls and the outer surfaces of the nozzle inserts. The inserts are typically made from a superalloy, such that their emissivity is high, thus promoting higher operating temperatures as a result of absorption of radiative thermal energy from the nozzle walls.

Various reflective coatings have been proposed in the past for the purpose of forming adherent heat shields on components which are subjected to thermal radiation. Such reflective coatings have often been a noble metal coating, such as platinum or gold, though other highly reflective materials have also been suggested. As a reflective coating, such heat shields are capable of reflecting most of the thermal radiation which is incident on the heat shield.

However, it has been determined that suitably reflective materials for use as a heat shield for nozzle inserts are unable to perform satisfactorily at the elevated temperatures sustained within the nozzle section of a gas turbine engine. More specifically, the reflectivity of such coatings significantly degrades at the elevated service temperatures of articles such as nozzle inserts, as a result of some constituents of the underlying substrate having a tendency to diffuse out into the coating when exposed to sufficiently high temperatures.

Accordingly, it would be desirable to provide a heat shield whose reflectivity is not degraded at elevated temperatures, particularly on the order of those experienced by hot section nozzle inserts of a gas turbine engine, such that the heat shield is able to effectively reflect a majority of the thermal radiation which is incident on the heat shield at such elevated temperatures.

SUMMARY OF THE INVENTION

It is an object of this invention to provide a heat shield for an article exposed to thermal radiation while operating at an elevated temperature.

It is a further object of this invention that such a heat shield be capable of reflecting thermal radiation, and that the reflectivity of the heat shield be substantially maintained at the elevated temperature.

It is still a further object of this invention to provide a method for forming such a heat shield.

It is yet an another object of this invention that such a heat shield be formed with a sublayer over which a reflective layer is formed, wherein the sublayer prevents the reflectivity of the reflective layer from being degraded at the elevated temperature.

The present invention generally provides a metal article which is adapted to be used in an environment in which the article is subjected to thermal radiation while at an elevated service temperature. A hot section nozzle insert of a gas turbine engine is an example of such an article. To shield the article from thermal radiation, the article is formed to have a heat shield over its exterior surfaces. The heat shield is composed of a barrier layer on the surfaces of the article, and a reflective layer on the barrier layer. The reflective layer serves to reflect a majority of the thermal radiation which is incident on the heat shield. For this purpose, the reflective layer is preferably formed a noble metal, a noble metal alloy, or aluminum.

The task of the barrier layer is to substantially prevent degradation of the reflective layer at the elevated service temperature, so as to prevent the reflectivity of the reflective layer from being degraded at the elevated service temperature of the article. For this purpose, the barrier layer is preferably an oxide, such as aluminum oxide, yttria-stabilized zirconia, or an oxide of an alloy constituent from which the article is formed. Alternatively, the barrier layer could be formed by a nitride, with other materials also being foreseeably used if they are capable of preventing the degradation of the reflective coating's reflectivity in accordance with this invention. In any event, the barrier layer preferably has a thickness of up to about 25 micrometers. The barrier layer can be formed using known deposition techniques, or by oxidizing the surface of the article at a temperature above the article's anticipated service temperature.

In accordance with this invention, the barrier layer advantageously serves to prevent the degradation of the reflective layer's reflectivity by preventing elemental constituents of the underlying article from diffusing into the reflective layer, which tends to occur at sufficiently high temperatures of about 500° C. or more, depending on the compositions of the reflective layer and the article. As such, the heat shield of this invention exhibits suitable reflectivity over a large temperature range, so as to make the heat shield particularly suited for use on articles which are subjected to thermal radiation while at an elevated service temperature. Accordingly, an article which in service is exposed to high levels of thermal radiation but equipped with the heat shield of this invention will exhibit a significantly lower operating temperature than without the heat shield.

An additional advantage of this invention is that the barrier layer also serves to thermally insulate the article from the heat shield, such that any absorption of thermal radiation by the heat shield will have a significantly limited effect on the operating temperature of the article due to the increased resistance to thermal conduction between the heat shield to the article. As a result, the service temperature of the article is further reduced by utilizing the barrier layer of this invention.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
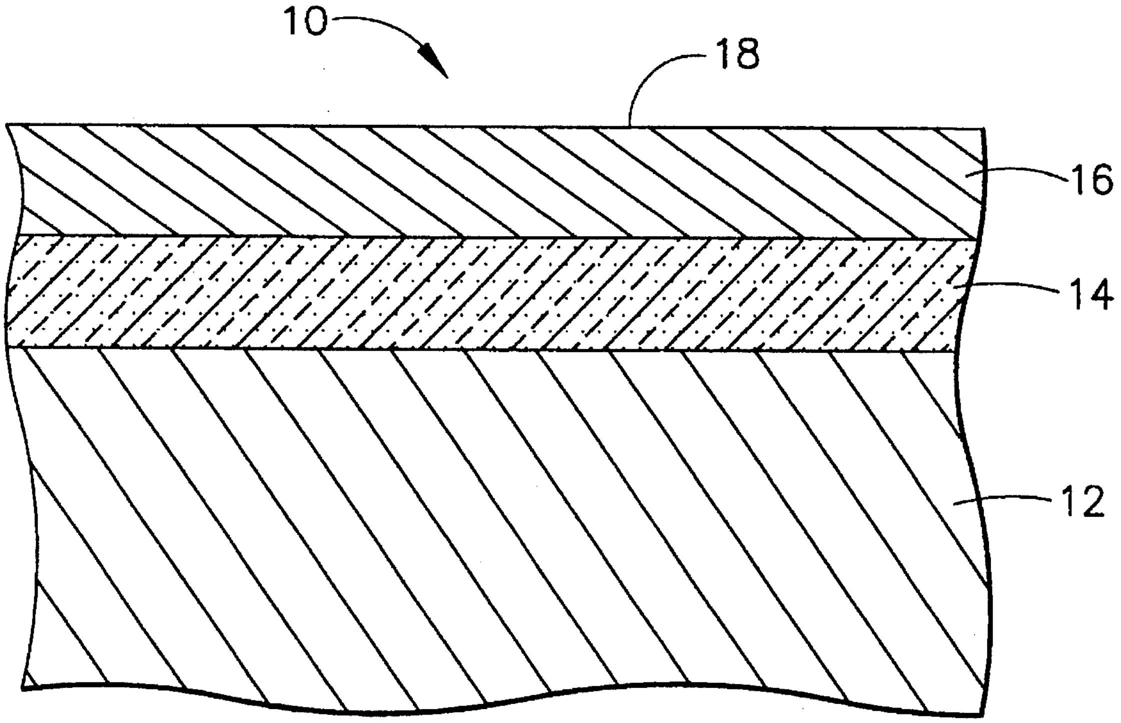
FIG. 1 shows in cross-section a portion of a nozzle insert for a gas turbine engine in accordance with this invention.

The present invention is generally directed to metal articles used in environments in which the articles are subjected to relatively high levels of thermal radiation, while at an elevated service temperature. While the advantages of this invention will be illustrated and described with reference to components of gas turbine engines, such as hot section nozzle inserts and the like, the advantages of this invention are function-specific and not product-specific. In particular, the teachings of this invention are generally applicable to any application in which a heat shield would be useful in reflecting thermal radiation from a component which must operate at an elevated temperature. For example, the invention is also applicable to high pressure turbine nozzles, which are subjected to a significant radiative heat transfer from the combustor of the gas turbine engine to the leading edge of the turbine nozzle.

To illustrate the invention, a cross-section portion of a hot section nozzle insert 10 of a gas turbine engine is shown in FIG. 1. As is conventional, the insert 10 is preferably formed from a nickel-base superalloy, though other suitable high temperature materials could alternatively be used. The emissivity of the surface formed by a superalloy is relatively high, such that a significant portion of the thermal radiation which is incident on the surface of the insert 10 will be absorbed by the insert 10. As a result, the service temperature of the insert 10 can be significantly increased over the temperature of the insert's operating environment.

In accordance with this invention, the effect which thermal radiation will have on the operating temperature of the insert 10 is significantly reduced by the presence of a heat shield on the surface of the insert 10. Specifically, the heat shield is formed as a reflective coating 16 which forms a reflective surface 18 on the insert 10, as shown in FIG. 1. In order to appropriately reflect thermal radiation, the material which forms the reflective coating 16 must have a relatively low emissivity, corresponding to a relatively high reflectivity.

Numerous materials are known in the art to have high reflectivity, though materials particularly suitable for the present application include the noble metals, such as platinum, platinum-rhodium alloys, and gold, as well as aluminum. The above materials are preferred for the reflective coating 16 of this invention because of their high reflectivities/low emissivities and their ability to be provide a highly reflective surface when formed using conventional deposition techniques. Furthermore, their melting temperatures are sufficiently above the service temperature to which they will be subjected during the operation of the engine. Finally, these materials can be readily deposited to form a reflective coating 16 which is sufficiently thick, preferably up to about 10 micrometers, to yield an opaque coating, and have a sufficiently micro-smooth finish so as to maximize the reflectivity of the coating 16.

However, it has been determined that the reflectivity of the reflective surface 18 formed by the above materials will significantly degrade at operating temperatures to which the insert 10 is subjected, which can be on the order of about 500° C. and higher. More specifically, it has been determined that some elemental constituents of the underlying insert 10 will tend to diffuse out into the reflective coating 16 when exposed to temperatures typically sustained in the hot nozzle section of a gas turbine engine, such that the reflective surface 18 is significantly degraded to the point where its reflectivity is inadequate for protecting the underlying insert 10.

As a solution, the present invention employs a barrier layer 14 which serves to advantageously interact with the reflective coating 16 in order to prevent degradation of the reflectivity of the reflective surface 18. Preferred barrier layers 14 are those which can be deposited onto or grown from the bare surface of the insert 10, as represented by the substrate 12 in FIG. 1. Suitable techniques by which the barrier layer 14 can be deposited include chemical and physical vapor deposition (CVD and PVD), electroplating and plasma spray techniques, all of which are known in the art and therefore will not be discussed in any detail. Preferred materials which can be readily deposited using the preferred techniques to form the barrier layer 14 are nitrides and oxides, such as alumina ($Al_2O_3$) and yttria-stabilized zirconia. Alternatively, a suitable barrier layer 14 can be grown as an oxide layer from suitable substrates 12.

In the context of nozzle inserts 10 for a gas turbine engine, the inserts 10 are typically formed from a nickel-base superalloy, in which aluminum is often a constituent of the alloy and, if present in sufficient amounts, is available to form alumina as the barrier layer 14 on the substrate 12 of the insert 10. Regardless of the manner in which the barrier layer 14 is formed, a preferable thickness range is on the order of about 0.1 to about 25 micrometers, with a preferred maximum thickness being on the order of about 10 micrometers, though it is foreseeable that greater and lesser thicknesses could be employed. Generally, barrier layers 14 having a thickness of less than about 0.1 micrometers will not provide adequate coverage, while barrier layers 14 having a thickness of greater than about 25 micrometers will have a tendency to spall, and therefore are not desirable.

In accordance with this invention, it was determined that oxides and nitrides of the type noted above are capable of forming a barrier layer 14 which can prevent the reflectivity of the reflective coating 16 from degrading when exposed to temperatures on the order of about 500° C. and higher. In particular, in the presence of the barrier layer 14, elemental constituents of the substrate 12 are prevented from diffusing out into the reflective coating 16, which would otherwise result in the general degradation of the reflective coating 16 and therefore a physical degradation of the surface 18 of the reflective coating 16. As a result of this invention, the reflective coating 16 of this invention is capable of sufficiently reflecting thermal radiation at temperatures experienced by the nozzle insert 10 within the hot section of a gas turbine engine.

In addition, the barrier layer 14 also serves to thermally insulate the substrate 12 from the reflective coating 16. As a result, any heating of the reflective coating 16 due to absorption of thermal radiation will have a limited impact on the temperature of the insert 10 due to an increased resistance to thermal conduction between the reflective coating 16 and the substrate 12. As a result, the service temperature of the insert 10 is further minimized by utilizing the barrier layer 14 of this invention, particularly when present in thicknesses towards the upper end of the preferred thickness range.

While discussed in terms of a metal article such as the insert 10, the teachings of this invention are also applicable to articles on which a ceramic layer is formed or deposited, in that ceramic materials generally provide the advantageous function of the barrier layer 14 when adherently formed on the surface of the article. In effect, the barrier layer 14 can be formed in any suitable manner and can be of any suitable material which will prevent the reflectivity of the reflective coating 16 from degrading when exposed to elevated temperatures on the order of about 500° C. and higher.

Therefore, while our invention has been described in terms of a preferred embodiment, it is apparent that other forms could be adopted by one skilled in the art, such as by substituting other suitable materials, or by utilizing various methods for depositing or forming the barrier layer. Accordingly, the scope of our invention is to be limited only by the following claims.

What is claimed is:

1. A metal article in an environment in which the article is subject to thermal radiation while at an elevated service temperature, the article having a heat shield comprising:

a barrier layer on a surface of the article; and a reflective layer on the barrier layer such that the reflective layer reflects most of the thermal radiation incident on the article, the reflective layer being formed from a material which is selected from the group consisting of the noble metals, noble metal alloys and aluminum, wherein the barrier layer is sufficiently thick so as to substantially prevent degradation of the reflective layer at the elevated service temperature, such that the reflectivity of the reflective layer is not degraded at the elevated service temperature.

2. An article as recited in claim 1 wherein the article is a hot section nozzle insert of a gas turbine engine.

3. An article as recited in claim 1 wherein the article is formed from a superalloy.

4. An article as recited in claim 1 wherein the reflective layer is formed from platinum or a platinum-rhodium alloy.

5. An article as recited in claim 1 wherein the barrier layer is an oxide or a nitride.

6. An article as recited in claim 1 wherein the barrier layer is aluminum oxide or yttria-stabilized zirconia.

7. An article as recited in claim 1 wherein the barrier layer is an oxide of an alloy constituent from which the article is formed.

8. An article as recited in claim 1 wherein the reflective layer has a thickness of up to about 10 micrometers.

9. An article as recited in claim 1 wherein the barrier layer has a thickness of about 0.1 to about 25 micrometers.

10. A hot section nozzle insert of a gas turbine engine, such that the nozzle insert is subjected to thermal radiation while at an elevated service temperature, the nozzle insert being formed from a superalloy, the nozzle insert having a heat shield comprising:

an oxide layer on a surface of the nozzle insert, the oxide layer having a thickness of about 0.1 to about 25 micrometers, the oxide layer being an oxide selected from the group consisting of aluminum oxide, yttria-stabilized zirconia, and an oxide of an alloy constituent of the superalloy;

a reflective layer on the oxide layer such that the reflective layer reflects most of the thermal radiation incident on the article, the reflective layer being formed from a material which is selected from the group consisting of the noble metals, noble metal alloys, and aluminum, wherein the oxide layer substantially prevents degradation of the reflective layer at the elevated service temperature, such that the reflectivity of the reflective layer is not degraded at the elevated service temperature.

* * * * *